US007530792B2

(12) United States Patent
Luna et al.

(10) Patent No.: US 7,530,792 B2
(45) Date of Patent: May 12, 2009

(54) COMPONENT OF VARIABLE THICKNESS HAVING RESIDUAL COMPRESSIVE STRESSES THEREIN, AND METHOD THEREFOR

(75) Inventors: Alberto Luna, Cincinnati, OH (US); Joshua Leigh Miller, West Chester, OH (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 11/428,149

(22) Filed: Jun. 30, 2006

(65) Prior Publication Data

US 2008/0003109 A1 Jan. 3, 2008

(51) Int. Cl.
*B64C 27/46* (2006.01)

(52) U.S. Cl. .................. 416/223 R; 416/224; 416/225; 416/241 R; 29/889.2

(58) Field of Classification Search ................ 416/224, 416/223 R, 241 R, 225; 29/889, 889.2, 889.7, 29/889.71

See application file for complete search history.

(56) References Cited

U.S. PATENT DOCUMENTS 5,591,009 A * 1/1997 Mannava et al. ........ 416/241 R
5,620,307 A * 4/1997 Mannava et al. ........ 416/241 R
5,826,453 A * 10/1998 Prevey, III ..................... 72/75
6,672,838 B1 * 1/2004 Crall et al. .................. 416/224

FOREIGN PATENT DOCUMENTS

| | | | |
|---|---|---|---|
| EP | 1175956 | A | 1/2002 |
| JP | 61060875 | A | 3/1986 |
| WO | 0164398 | A | 9/2001 |
| WO | 2007055864 | A | 5/2007 |

OTHER PUBLICATIONS

ASM International Handbook Committee: "ASM Handbook. vol. 4 Heat Treating"; Aug. 1991; ASM International, USA, XP002456588; p. 607.

* cited by examiner

*Primary Examiner*—Igor Kershteyn
(74) *Attorney, Agent, or Firm*—Adams Intellectual Property Law, P.A.; William Scott Andes, Esq.

(57) ABSTRACT

A method of reducing crack propagation includes: providing a metallic component having an exterior surface, and using a burnishing element to apply a varying to the exterior surface within a selected area, within which the component has a varying thickness, so as to create a region of residual compressive stress of surrounded by an interior boundary. The distance from the interior boundary to the exterior surface at any location within the selected area is independent of the thickness of the component at that location, and may be controlled by changing the pressure and/or an amount of overlap between burnished segments.

23 Claims, 7 Drawing Sheets

222
238
250
214
254
F
D''

COMPONENT OF VARIABLE THICKNESS HAVING RESIDUAL COMPRESSIVE STRESSES THEREIN, AND METHOD THEREFOR

BACKGROUND OF THE INVENTION

This invention relates generally to fatigue-resistant and damage-tolerant components and methods of producing such components.

Various metallic, ceramic, and composite components, such as gas turbine engine fan and compressor blades, are susceptible to cracking from fatigue and damage (e.g. from foreign object impacts). This damage reduces the life of the part, requiring repair or replacement.

It is known to protect components from crack propagation by inducing residual compressive stresses therein. Methods of imparting these stresses include shot peening, laser shock peening (LSP), pinch peening, and low plasticity burnishing (LPB). These methods are typically employed by applying a "patch" of residual compressive stresses over an area to be protected from crack propagation, for example a leading edge of a gas turbine engine compressor blade.

During a burnishing operation, the depth of the compressive residual stress layer can be controlled with process parameters. It is known to control those parameters to transition from high stress areas to low stress areas to prevent a high gradient from compressive to tensile stress fields (this technique is known as "feathering"). However, through the rest of the process, the parameters are held constant, even when processing non-uniform cross-sections (triangular cross-sections, for example). This can result in areas of tensile stresses between layers of compressive residual stress, along with areas where the compressive residual stresses are higher than the intended range.

FIG. 1 illustrates a generic metallic component 10 with a surface 12. A burnishing element 14 is pressed against the surface under substantial pressure and translated along a selected path. In this example the burnishing element 14 is a sphere, but cylindrical rollers are also used. Typically a pressurized fluid is used to force the burnishing element 14 onto the surface 12 of the component 10. Mechanically loaded tools are also used. Appropriate equipment, of a known type, typically CNC controlled, is provided to load the burnishing element 14, and to move it along the desired path. The pressing force used during burnishing is such that it induces plastic strain and a region of residual compressive stresses 16 within the component 10 near a burnished area 18. A region of residual tensile stresses 17 exists around the border of the region 16.

FIG. 2 illustrates an exemplary gas turbine engine compressor blade 20. This component is used merely as an example of a part to which both prior art methods and the present invention may be applied. the present invention is equally applicable to other types of components susceptible to cracking from fatigue or damage, such as compressor stator vanes, fan blades, turbine blades, shafts and rotors, stationary frames, actuator hardware and the like. Such components may be made from metal alloys, ceramics, or composite materials (e.g. carbon fiber composites). The compressor blade 20 includes an airfoil 22, a platform 24, and a shank 26. In this particular example the shank 26 includes a dovetail 28 for being received in a slot of a rotating disk (not shown). The airfoil 22 has a leading edge 30, a trailing edge 32, a tip 34, a root 36, a pressure side 38, and a suction side 40 opposite the pressure side 38. A burnishing tool 42 carrying a burnishing element 14 is shown tracing out a selected burnishing path "P" along the surface of the airfoil 22. In this example, the path "P" includes a plurality of linear segments 23 arranged in a series of S-turns. The path has a footprint with a width "W" determined by the width of the burnishing element 14 and the applied pressure. The linear segments 23 are separated by an step-over distance "S". In cases where the step-over distance S is less than the width W, overlap of the segments 23 will occur. In most applications, there will be substantial overlap to achieve adequate coverage and desired stress profiles.

FIGS. 3A and 3B illustrate a prior art burnishing treatment being applied to edge 32 of the airfoil 22. FIG. 3A shows the treatment being applied to the pressure side 38 by a single burnishing element 14, while the airfoil is supported by a block 44. In this case, a constant applied pressure in the normal direction "f" is selected to generate a region 46 of residual compressive stress which has depth "d" defined as a distance from the surface of the pressure side 38, expressed as a fraction of the total thickness of the airfoil 22 at the point of measurement. The burnishing element 14 is moved from left to right. The depth d will decrease substantially as the burnishing element 14 traverses the thicker portion of the airfoil 22 distal from the trailing edge 32. The result is that the interior boundary 48 of the region 46 is not parallel to a mid-chord plane M of the airfoil 22. Under these circumstances, the depth d will vary significantly from a desired magnitude at opposite axial ends of the region 46, regardless of which end is used as the basis for setting the applied pressure.

FIG. 3B illustrates the prior art burnishing treatment being applied to both the pressure side 38 and the suction side 40 of the airfoil 22 by opposed burnishing elements 14 and 14'. In this case, the applied pressure in the normal directions, denoted f and f', are selected to generate regions 50 and 52 of residual compressive stress which have depths d and d' measured from the surface of the pressure side 38 and suction side 40, respectively, and expressed as a fraction of the total thickness of the airfoil 22 at the point of measurement. The depths d and d' are typically chosen to generate through-thickness residual compressive stress near the trailing edge 32. However, as shown, the depths d and d' will decrease substantially as the burnishing elements 14 and 14' traverse the thicker portion of the airfoil 22 distal from the trailing edge 32. The result is that the interior boundaries 54 and 56 of the regions 52 and 54 are not parallel to a midplane M of the airfoil 22. If the pressures f and f are just enough that through-thickness residual compressive stress is produced near the trailing edge 32, this results in an internal region 58 of residual tensile stress at thicker portions of the airfoil 22. It is possible to select the pressures f and f' so that the regions 50 and 52 merge to produce through-thickness residual compressive stress, even at the thickest portion of the treated area. However, this would result in excessive compressive stress levels near the trailing edge 32, because of overlap of the regions 50 and 52. It could also damage the airfoil 22 and result in undesired deformation.

In light of the above shortcomings of the prior art, there is a need for a method of producing uniform through-thickness residual compressive stresses in components of variable thickness.

BRIEF SUMMARY OF THE INVENTION

The above mentioned need is met by the present invention, which provides a method for varying the parameters of a burnishing operation in consideration of the workpiece thickness so that a desired penetration depth of residual compressive stress is achieved regardless of local thickness.

According to one aspect, the invention provides a component having at least one exterior surface, the component including at least one region of residual compressive stress extending inwards from the surface in at least one selected area within which the thickness of the component varies, the region surrounded by an interior boundary.

According to another aspect of the invention, an airfoil for a gas turbine engine includes a root spaced apart from a tip, spaced-apart leading and trailing edges, a suction side extending from the leading edge to the trailing edge, and an opposed pressure side extending from the leading edge and the trailing edge. A thickness of the airfoil is defined between the pressure side and the suction side; and a first region of residual compressive stress extending inward from a first area of a selected one of the pressure side and the suction side. The thickness of the airfoil varies within the first area, and the first region is surrounded by a first interior boundary, A second region of residual compressive stress extends inward from a second area of a the other one of the pressure side and the suction side, the thickness of the airfoil varying within the second area, wherein the second region is surrounded by a second interior boundary. Substantially all of the first and second interior boundaries are blended together.

According to another aspect of the invention, a method of reducing crack propagation in components includes: providing a component having an exterior surface; and using a burnishing element to apply a varying pressure to the exterior surface within a selected area, within which the component has a varying thickness, so as to create a region of residual compressive stress surrounded by an interior boundary; wherein the distance from the interior boundary to the exterior surface at any given location within the selected area is independent of the thickness of the component at that location.

According to another aspect of the invention, a method of reducing crack propagation in components includes providing a component having opposed, spaced-apart first and second exterior surfaces; and using first and second burnishing elements to apply a varying pressure to the exterior surfaces within respective first and second selected areas, within which the component has a varying thickness, so as to create first and second regions of residual compressive stress surrounded by first and second interior boundaries. The distance from each of interior boundaries to the respective exterior surface at any given location within the respective selected area is independent of the thickness of the component at that location.

According to another aspect of the invention, a method of reducing crack propagation in components, includes: providing a component having opposed, spaced-apart first and second exterior surfaces; and using a first burnishing element to apply a pressure to the first exterior surface within a first selected area, within which the component has a varying thickness, while moving the first burnishing element along a first preselected path including segments separated by a step-over distance, so as to create a first region of residual compressive stress surrounded by a first interior boundary; wherein the step-over distance is selected to control an amount of overlap between adjacent segments, consequently changing the distance from the first interior boundary to the first exterior surface, such that the distance from the interior boundary to the first exterior surface at any given location within the first selected area is independent of the thickness of the component at that location.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 4A:
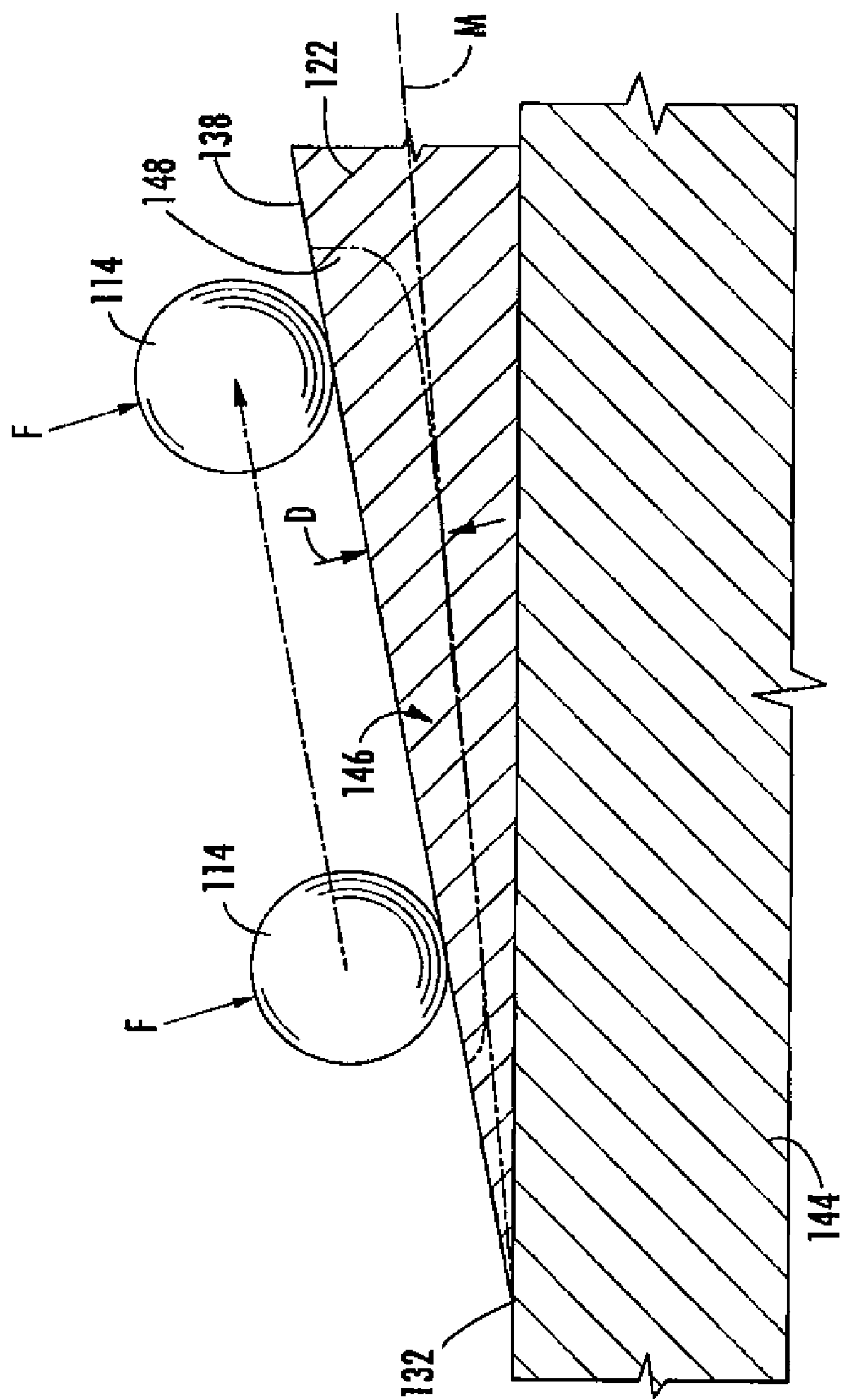
FIG. 4A is a schematic side view of a burnishing treatment as described herein being applied to a single side of a compressor blade.
Figure 4B:
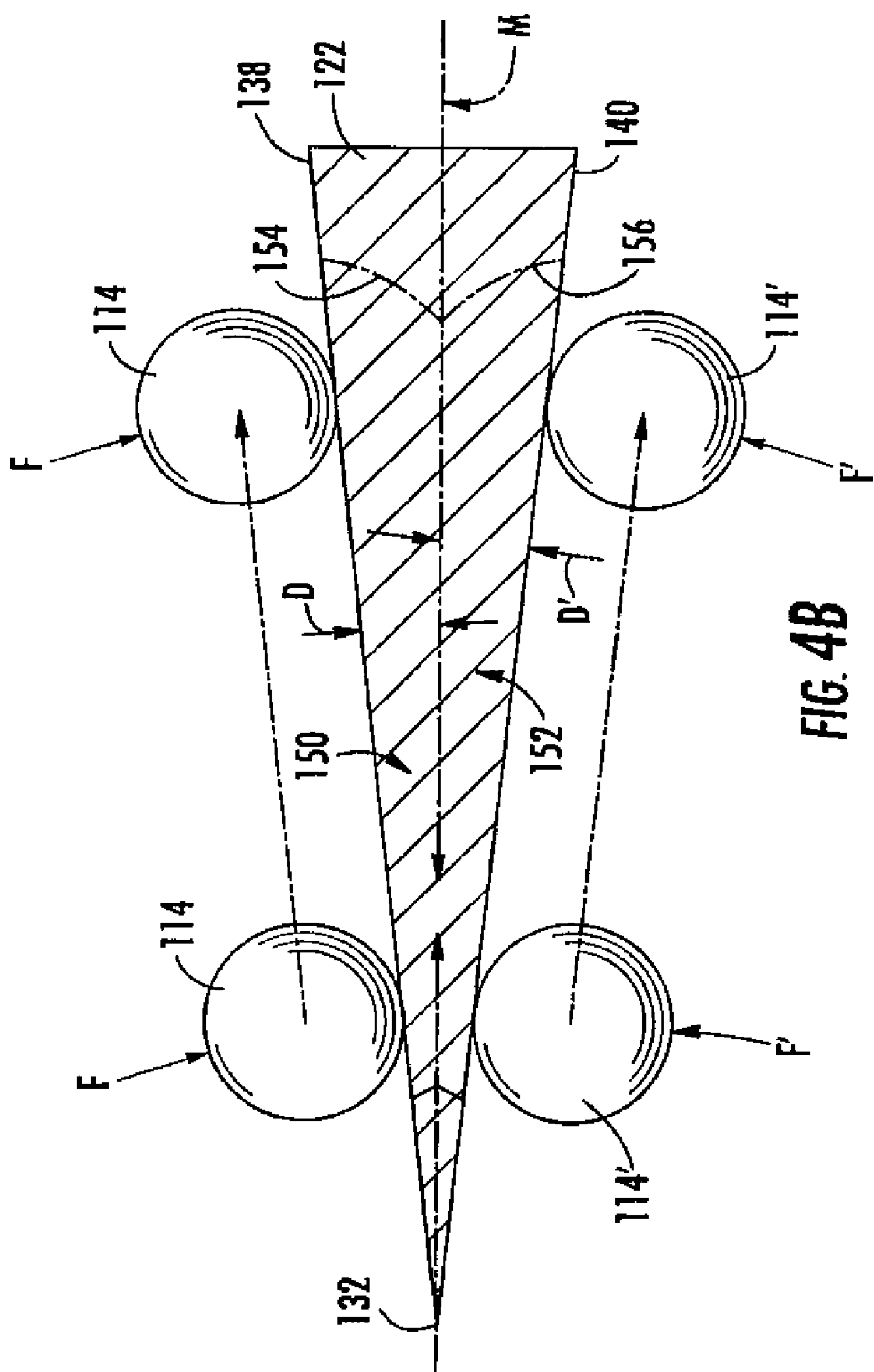
FIG. 4B is a schematic side view of a burnishing treatment as described herein being applied to both sides of a compressor blade.

FIGS. 4A and 4B illustrate an exemplary burnishing treatment in accordance with an aspect of the invention being applied to the trailing edge region of an airfoil 122, which before treatment is identical to the airfoil 22 described above. FIG. 4A shows the treatment being applied to the pressure side 138 within a selected area by a burnishing element 114, while the airfoil 122 is supported by a block 144. The treatment described herein may be applied to any portion of the airfoil 122. In this case, the applied pressure in a direction normal to the surface, indicated at F, is selected to generate a region 146 of residual compressive stress which has a depth D (this could also be described as penetration) measured from the surface of the suction side 138, and expressed as expressed as a fraction of the total thickness of the airfoil 122 at the point of measurement. To achieve a more uniform depth D, the burnishing parameters are changed as the burnishing element 114 moves to areas of different thicknesses. Specifically, as the burnishing element 114 is moved from a position near the trailing edge 132 to a thicker portion of the airfoil 122 distal from the trailing edge 132, the pressure F in the normal direction is increased. The pressure is generally proportional to the thickness. Using this varying pressure, it is possible to generate a region 146 which has an interior boundary 148 with a selected profile. The interior boundary 148 may be made parallel to an arbitrary preselected interior plane. In the illustrated example, a substantial portion of the interior boundary 148 is substantially parallel to, and coincident with, a midplane M of the airfoil 122.

Figure 1:
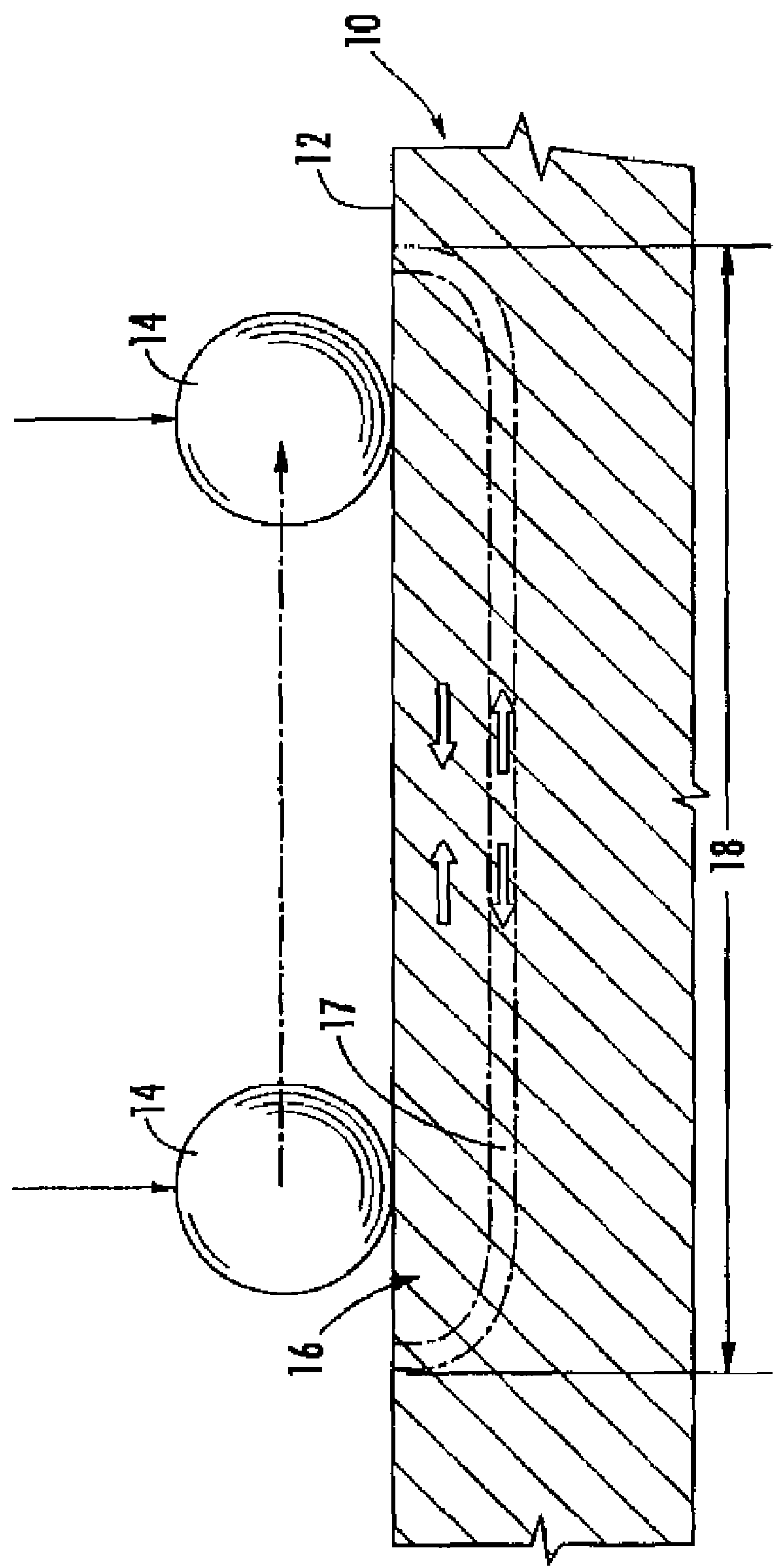
FIG. 1 is a schematic side view of a prior art burnishing process being applied to a surface of a component.
Figure 2:
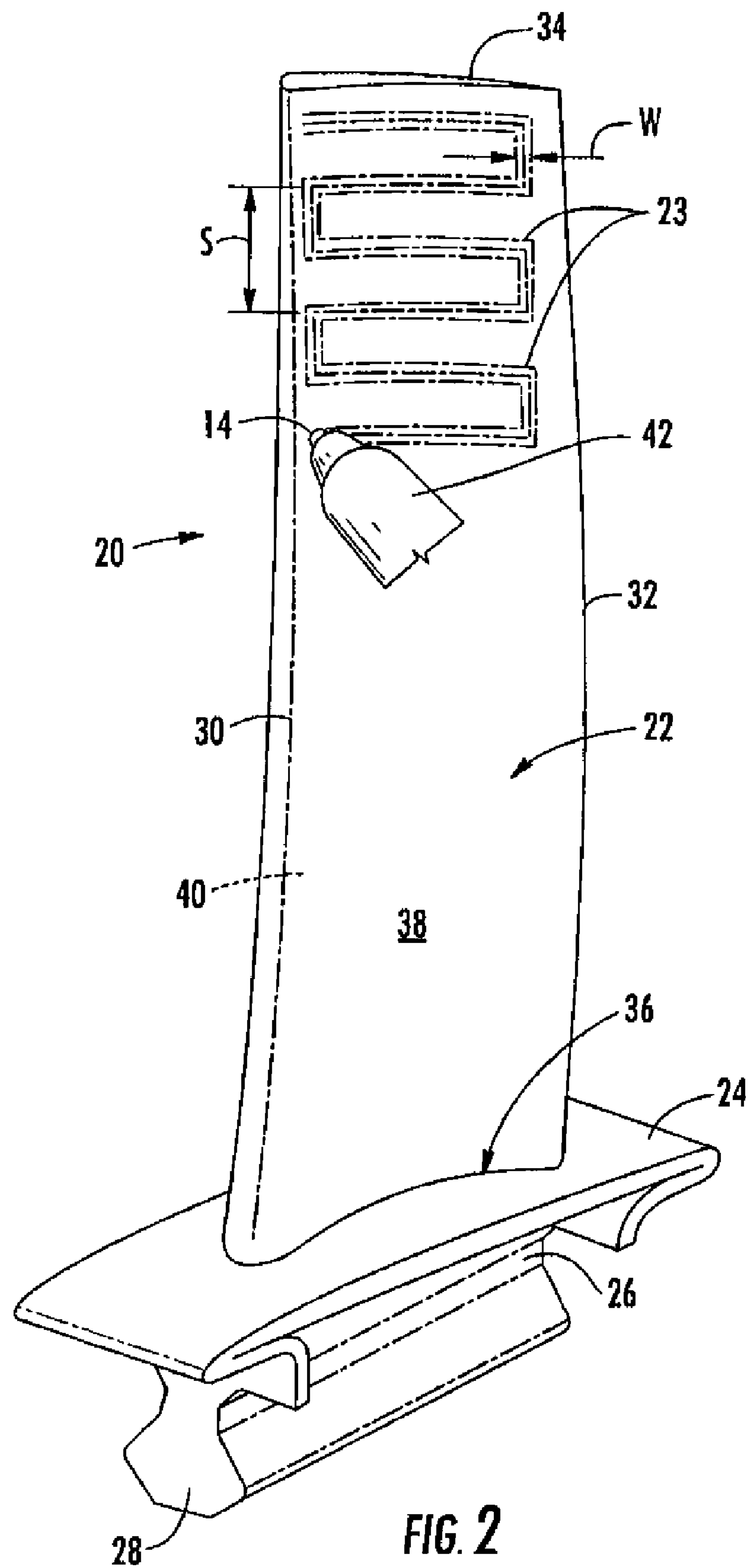
FIG. 2 is a schematic perspective view of a prior art burnishing process being applied to a gas turbine engine compressor blade.
Figure 3A:
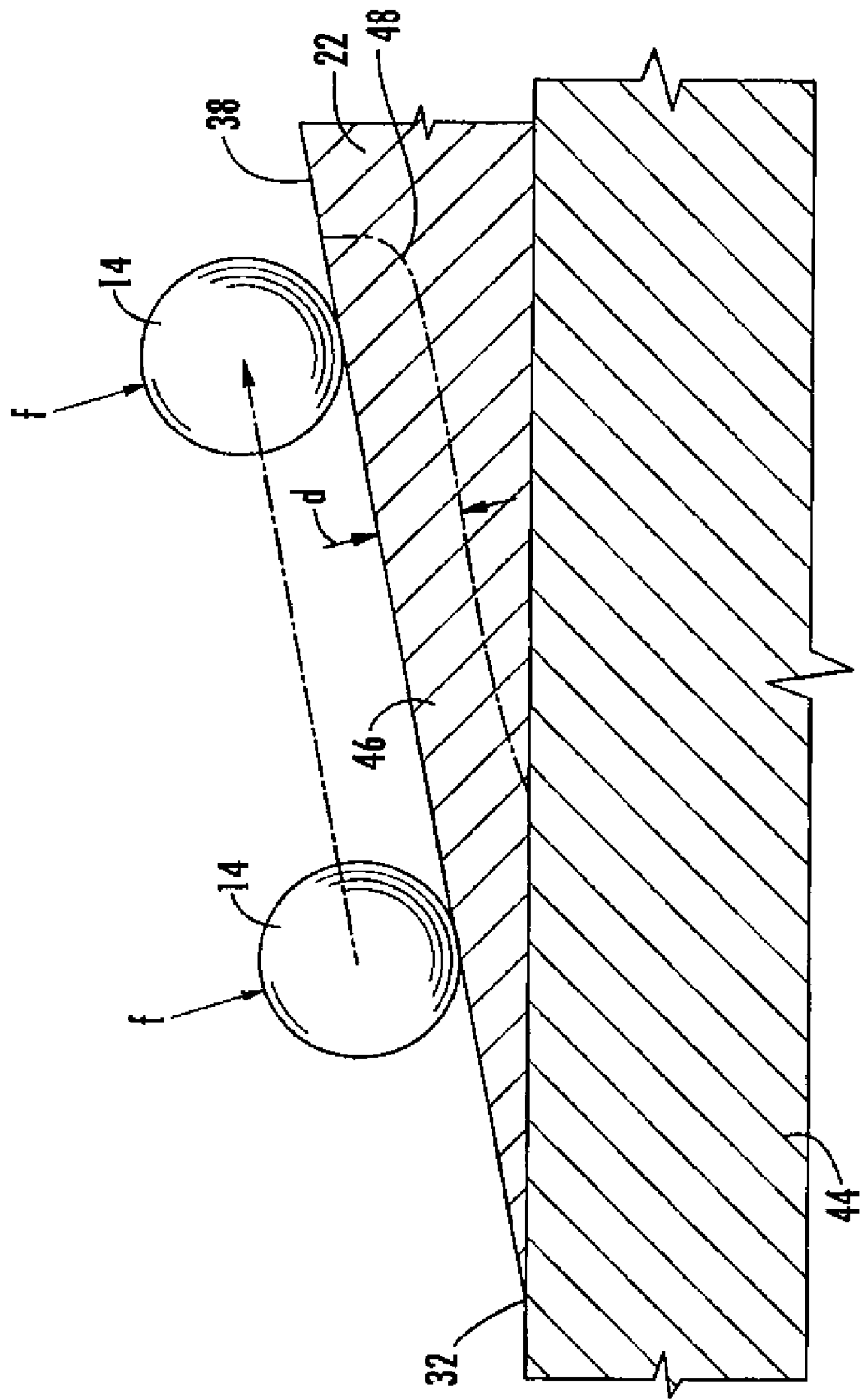
FIG. 3A is a schematic side view of a prior art burnishing treatment being applied to a single side of the compressor blade of FIG. 2.
Figure 3B:
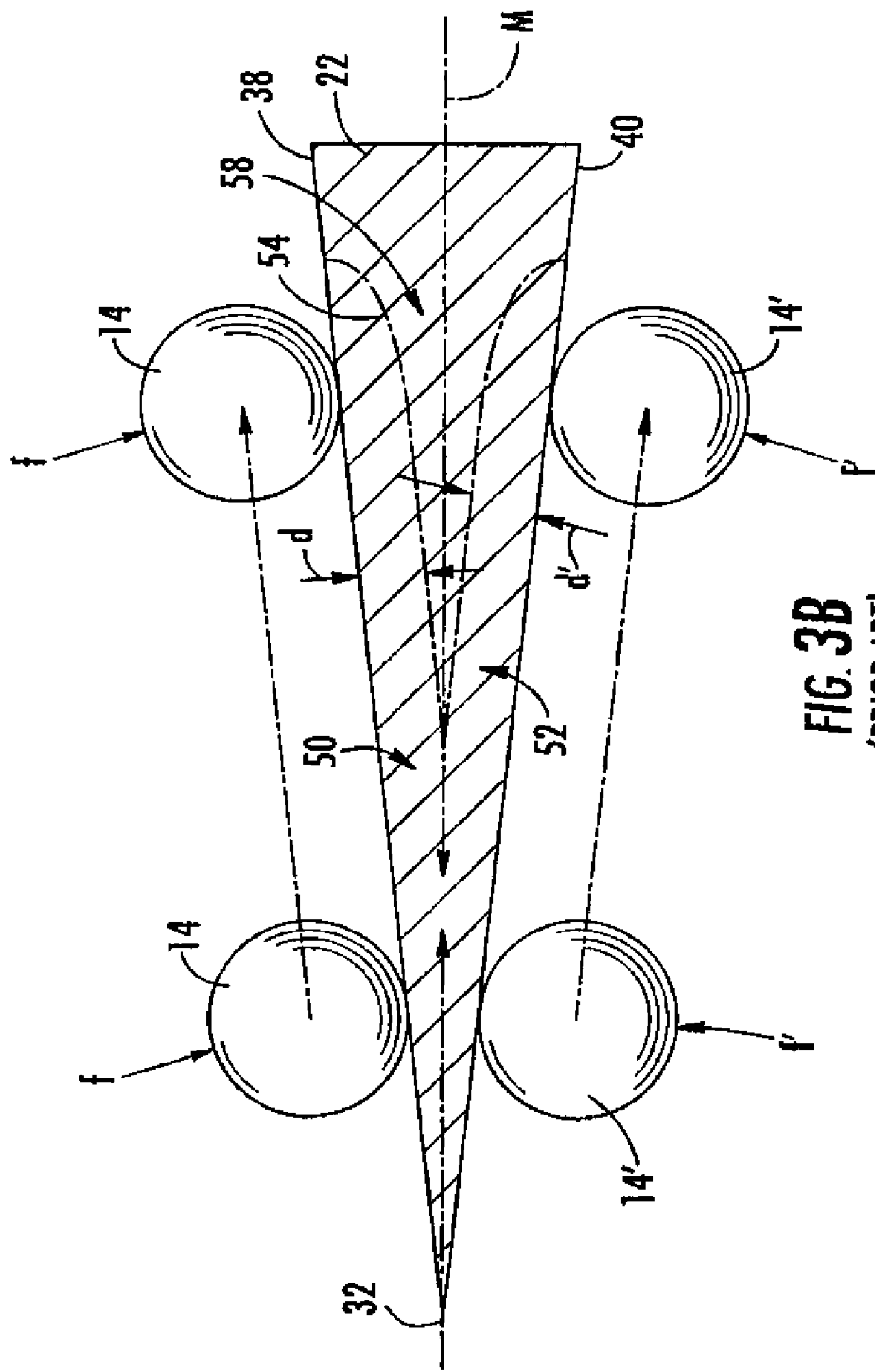
FIG. 3B is a schematic side view of a prior art burnishing treatment being applied to both sides of the compressor blade of FIG. 2.

The depth D may also be manipulated to control the interior boundary 148 in whole or in part by controlling the amount of overlap between burnished segments as the burnishing element 114 is moved through a selected path. For example, if the step-over distance (denoted "S" in FIG. 2) is greater than the burnished segment width "W", there will be no overlap. As the step-over distance is decreased to less than the width "W", the overlap increases. The greater the overlap, the greater the depth D will be. This is true even when the applied pressure is held constant, although the effect on depth D of overlap alone is thought to be less than that of the burnishing pressure, FIG. 4B illustrates an exemplary burnishing treatment in accordance with another aspect of the invention being applied to both the pressure side 138 and the suction side 140 of the airfoil 122 within selected areas thereof by opposed burnishing elements 114 and 114'. In this case, the applied pressures in the normal directions, indicated at F and F' are selected to generate regions 150 and 152 of residual compressive stress which have depths D and D' measured from the surface of the pressure side 138 and suction side 140, respectively, and expressed as a fraction of the of the total thickness of the airfoil 122 at the point of measurement. This depths D and D' are chosen so that substantially all of their interior boundaries 154 and 156 are blended together at a midplane M of the airfoil 122. Substantially all of, or portions of, the interior boundaries 154 and 156 may be coincident with each other. This results in the generation of through-thickness residual compressive stress in the selected areas without exceeding desired compressive stress levels. As noted above, the interior boundaries 154 and 156 may have arbitrary preselected profiles and may be made parallel to arbitrary, preselected interior planes. The area of residual tensile stress 58 described above with respect to the prior art method is eliminated.

The depths D and D' may also be manipulated to control the interior boundaries 154 and 156 in whole or in part by controlling the amount of overlap between burnished segments as the burnishing elements 114 and 114' are moved through selected paths, as described above with respect to the single burnishing element 114.

Figure 5:
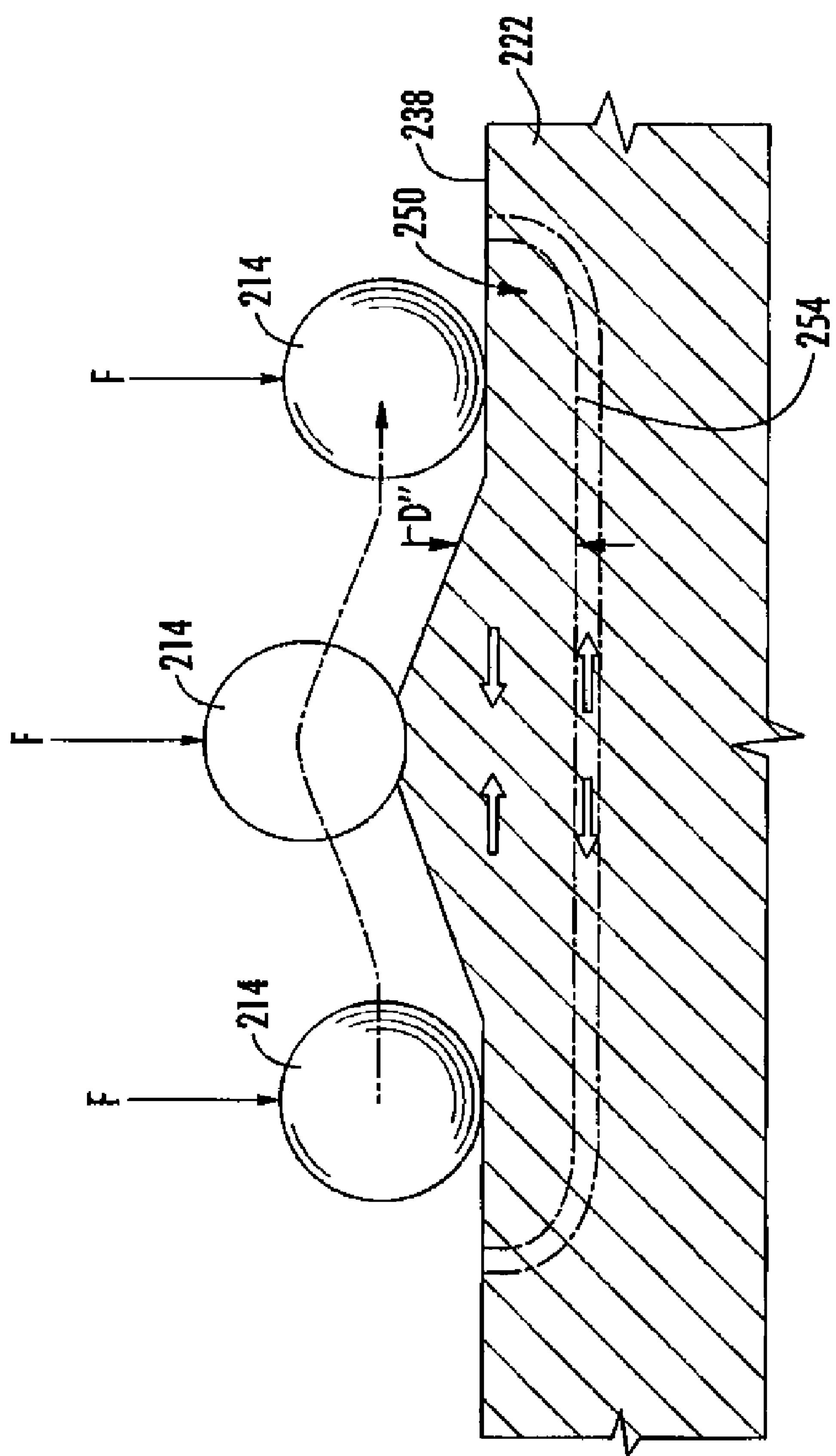
FIG. 5 is a side view of a burnishing treatment as described herein being applied to a component of variable thickness.

FIG. 5 illustrates the another exemplary burnishing treatment in accordance with an aspect of the invention being applied to a surface 238 of a component 222 within a selected area by a burnishing element 214. In this case, the surface 138 includes at least one feature 139 (such as a ridge or groove) which extends significantly above or below the remainder thereof. The applied pressure F in the normal direction is varied as described above to generate a region 250 of residual compressive stress which has a varying depth D" measured from the surface 238 and expressed as a fraction of the total thickness of the component 222 at the point of measurement. Using this varying pressure, it is possible to give the interior boundary 254 a selected profile. The interior boundary 254 may be made parallel to an arbitrary preselected interior plane. In this case, the depth D" is varied such that substantially all of the interior boundary of 254 of the region 250 is substantially parallel to the surface 238.

The pressure variation described above may be achieved in various ways. For example, the pressure could be manually varied by operator control as the burnishing element traverses different portions of the workpiece. However, as the motion of the burnishing element is typically CNC-controlled, it is possible to analyze the dimensions of the workpiece and based on those dimensions, generate and store a data "map" relating desired pressure to identifiable coordinates points on the workpiece. The pressure on the burnishing element would then be automatically varied by the burnishing equipment based on reference to the map as the burnishing equipment moves the burnishing tool through a selected path having segments separated by a step-over distance as described above. In addition, the step-over may be controlled either to manipulate the overlap between segments when using a constant pressure, as described above, or to hold a selected amount of overlap constant throughout the process, since the width of the burnished segment varies with varying pressure. For example, if the burnishing pressure is increased, causing an increase in the width of the burnishing line, the control would correlate the increased pressure to the resulting increased with and the step-over distance for the next segment would be decreased so that the overlap is not undesirably increased.

The foregoing has described fatigue- and damage-resistant components and methods for making such components. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine, comprising:
   - a root spaced apart from a tip, spaced-apart leading and trailing edges, a suction side extending from the leading edge to the trailing edge, and an opposed pressure side extending from the leading edge and the trailing edge, wherein a thickness of the airfoil is defined between the pressure side and the suction side; and
   - a first region of residual compressive stress extending inward from a first area of a selected one of the pressure side and the suction side, the thickness of the airfoil varying within the first area;
   - wherein the first region is surrounded by a first interior boundary, and
   - a second region of residual compressive stress extending inward from a second area of the other one of the pressure side and the suction side, the thickness of the airfoil varying within the second area,
   - wherein the second region is surrounded by a second interior boundary, and substantially all of the first and second interior boundaries are blended together with each other; and
   - wherein at least a portion of the interior boundaries are coincident with a midplane of the airfoil.

2. The component of claim 1 wherein residual compressive stress extends through the thickness of the component within the first and second areas.

3. A method of reducing crack propagation in components, comprising:
   - providing a component having an exterior surface; and
   - using a burnishing element to apply a varying pressure to the exterior surface within a selected area, within which the component has a varying thickness, so as to create a region of residual compressive stress surrounded by an interior boundary;
   - wherein the distance from the interior boundary to the exterior surface at any given location within the selected area is independent of the thickness of the component at that location; and
   - wherein the exterior surface includes at least one feature that extends significantly above or below the remainder of the exterior surface and at least a portion of the interior boundary is substantially parallel to the remainder of the exterior surface.

4. The method of claim 3 wherein substantially all of the interior boundary is substantially parallel to the exterior surface.

5. The method of claim 3 wherein at least a portion of the interior boundary is parallel to a preselected plane within the component.

6. The method of claim 3 wherein the compressive stress extends through the thickness of the component within the selected area.

7. The method of claim 3 wherein the step of applying a varying pressure includes:

determining an array of identifiable coordinate points within the selected area;

determining a selected pressure to be applied to the exterior surface at each of the coordinate points;

storing a map which correlates the selected pressure to the coordinate points; and using a burnishing element to apply the selected pressure to each of the coordinate points with reference to the map.

8. The method of claim 7 wherein the burnishing element is moved along a preselected path including segments separated by a step-over distance, further including the steps of:

correlating the selected pressure to a resulting width of the segment generated by the burnishing element; and controlling the step-over distance with reference to the resulting width so as to maintain a substantially constant overlap between adjacent segments.

9. A method of reducing crack propagation in components, comprising:

providing a component having opposed, spaced-apart first and second exterior surfaces; and using first and second burnishing elements to apply a varying pressure to the exterior surfaces within respective first and second selected areas, within which the component has a varying thickness, so as to create first and second regions of residual compressive stress surrounded by first and second interior boundaries;

wherein the distance from each of the interior boundaries to the respective exterior surface at any given location within the respective selected area is independent of the thickness of the component at that location.

10. The method of claim 9 wherein substantially all of the first and second interior boundaries are substantially parallel to the respective exterior surfaces.

11. The method of claim 9 wherein the compressive stress extends through the thickness of the component within the selected areas.

12. The method of claim 9 wherein at least one of the exterior surfaces includes at least one feature that extends significantly above or below the remainder of that exterior surface.

13. The method of claim 9 wherein the step of applying a varying pressure includes:

determining an array of identifiable coordinate points within the selected areas;

determining a selected pressure to be applied to the exterior surfaces at each of the coordinate points; and using the first and second burnishing elements to apply the selected pressure to each of the coordinate points with reference to the map.

14. The method of claim 13 wherein each of the burnishing elements is moved along a preselected path including segments separated by a step-over distance, further including the steps of:

correlating the selected pressure to a resulting width of the segments generated by the burnishing elements; and controlling the step-over distance with reference to the resulting width so as to maintain a substantially constant overlap between adjacent segments.

15. A method of reducing crack propagation in components, comprising:

providing a component having opposed, spaced-apart first and second exterior surfaces; and using a first burnishing element to apply a pressure to the first exterior surface within a first selected area, within which the component has a varying thickness, while moving the first burnishing element along a first preselected path including segments separated by a step-over distance, so as to create a first region of residual compressive stress surrounded by a first interior boundary;

wherein the step-over distance is selected to control an amount of overlap between adjacent segments, consequently changing the distance from the first interior boundary to the first exterior surface, such that the distance from the interior boundary to the first exterior surface at any given location within the first selected area is independent of the thickness of the component at that location.

16. The method of claim 15 wherein substantially all of the first interior boundary is substantially parallel to the first exterior surface.

17. The method of claim 15 wherein the first exterior surfaces includes at least one feature that extends significantly above or below the remainder of the first exterior surface.

18. The method of claim 15 further comprising:

using a second burnishing element to apply a varying pressure to the second exterior surface within a second selected area, within which the component has a varying thickness, while moving the first burnishing element along a second preselected path including segments separated by a step-over distance, so as to create a second region of residual compressive stress surrounded by a second interior boundary, so as to create a second region of residual compressive stress surrounded by a second interior boundary;

wherein the step-over distance is selected to control an amount of overlap between adjacent segments, consequently changing the distance from the interior boundary to the second exterior surface, such that the distance from the second interior boundary to the second exterior surface at any given location within the second selected area is independent of the thickness of the component at that location.

19. The method of claim 18 wherein substantially all of the first and second interior boundaries are substantially parallel to the respective exterior surfaces.

20. The method of claim 18 wherein the compressive stress extends through the thickness of the component within the selected areas.

21. The method of claim 18 wherein at least one of the exterior surfaces includes at least one feature that extends significantly above or below the remainder of that exterior surface.

22. A method of reducing crack propagation in components, comprising:

providing a component having an exterior surface;

using a burnishing element to apply a varying pressure to the exterior surface within a selected area, within which the component has a varying thickness, so as to create a region of residual compressive stress surrounded by an interior boundary;

wherein the distance from the interior boundary to the exterior surface at any given location within the selected area is independent of the thickness of the component at that location; and wherein the step of applying a varying pressure includes:

determining an array of identifiable coordinate points within the selected area;

determining a selected pressure to be applied to the exterior surface at each of the coordinate points;

storing a map which correlates the selected pressure to the coordinate points; and using a burnishing element to apply the selected pressure to each of the coordinate points with reference to the map.

23. The method of claim 22 wherein the burnishing element is moved along a preselected path including segments separated by a step-over distance, further including the steps of:

correlating the selected pressure to a resulting width of the segment generated by the burnishing element; and controlling the step-over distance with reference to the resulting width so as to maintain a substantially constant overlap between adjacent segments.

* * * * *

US007530792C1

(12) EX PARTE REEXAMINATION CERTIFICATE (8539th)

United States Patent

Luna et al.

(10) Number: US 7,530,792 C1

(45) Certificate Issued: Sep. 13, 2011

(54) COMPONENT OF VARIABLE THICKNESS HAVING RESIDUAL COMPRESSIVE STRESSES THEREIN, AND METHOD THEREFOR

(75) Inventors: Alberto Luna, Cincinnati, OH (US); Joshua Leigh Miller, West Chester, OH (US)

(73) Assignee: General Electric Company, Schenectady, NY (US)

Reexamination Request:
No. 90/009,687, Apr. 12, 2010

Reexamination Certificate for:

Patent No.: 7,530,792
Issued: May 12, 2009
Appl. No.: 11/428,149
Filed: Jun. 30, 2006

(51) Int. Cl.
*B64C 27/46* (2006.01)

(52) U.S. Cl. .................... 416/223 R; 416/224; 416/225; 416/241 R; 29/889.2

(58) Field of Classification Search ........................ None
See application file for complete search history.

(56) References Cited

U.S. PATENT DOCUMENTS 5,826,453 A 10/1998 Prevey, III
6,415,486 B1 7/2002 Prevey, III
7,188,398 B2 3/2007 Prevey
7,600,404 B2 10/2009 Prevey, III

OTHER PUBLICATIONS

Paul S. Prevey et al., Application of Low Plasticity Burnishing to Improve Damage Tolerance of a Ti–6AJ–4V First Statge Fan Blade, Proceedings 44th AIAA/ASME/ASCE/AHS Structural Dynamics & Materials Conference, Apr. 7–10, 2003, Norfolk, VA USA.

Paul S. Prevey, Damage Tolerance Improvement of Ti–6–4 Fan Blades with Low Plasticity Burnishing, 6th Joint FAA/DoD/NASA Aging Aircraft Conference, Sep. 16–19, 2002.

*Primary Examiner*—Jeffrey R. Jastrzab

(57) ABSTRACT

A method of reducing crack propagation includes: providing a metallic component having an exterior surface, and using a burnishing element to apply a varying to the exterior surface within a selected area, within which the component has a varying thickness, so as to create a region of residual compressive stress of surrounded by an interior boundary. The distance from the interior boundary to the exterior surface at any location within the selected area is independent of the thickness of the component at that location, and may be controlled by changing the pressure and/or an amount of overlap between burnished segments.

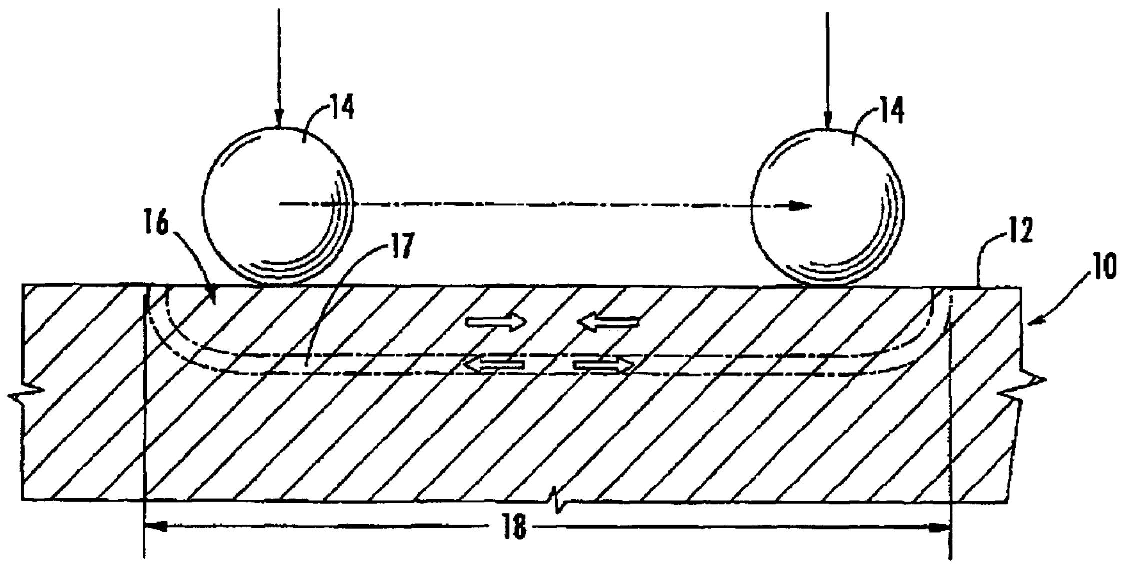

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-23 are cancelled.

* * * * *